(12) United States Patent
Lane et al.

(10) Patent No.: US 7,600,871 B2
(45) Date of Patent: Oct. 13, 2009

(54) CLIP-ON SUNGLASSES AND METHOD OF MANUFACTURE THEREOF

(75) Inventors: Henry Welling Lane, San Luis Obispo, CA (US); Eric Rhea, San Luis Obispo, CA (US)

(73) Assignee: Dioptics Medical Products, Inc., San Luis Obispo, CA (US)

( * ) Notice: Subject to any disclaimer, the term of this patent is extended or adjusted under 35 U.S.C. 154(b) by 277 days.

(21) Appl. No.: 11/827,395

(22) Filed: Jul. 11, 2007

(65) Prior Publication Data

US 2009/0015783 A1    Jan. 15, 2009

(51) Int. Cl.
G02C 9/00    (2006.01)
(52) U.S. Cl. .............................. 351/47; 351/57; 264/250
(58) Field of Classification Search ................... 351/47, 351/48, 57, 58, 110, 158, 41; 264/239, 250, 264/260
See application file for complete search history.

(56) References Cited

U.S. PATENT DOCUMENTS

| | | | |
|---|---|---|---|
| 5,274,404 | A | 12/1993 | Michael |
| 5,801,804 | A | 9/1998 | Pennise |
| 6,074,058 | A | 6/2000 | Anger |
| 6,234,628 | B1 | 5/2001 | Friedman |
| 6,302,538 | B1 | 10/2001 | Friedman |
| 6,398,362 | B1 | 6/2002 | Masunaga |
| 6,557,997 | B1 | 5/2003 | Sieberg |
| 6,755,521 | B1 | 6/2004 | Begg |
| 7,052,129 | B2 | 5/2006 | Chao et al. |
| 7,117,990 | B2 * | 10/2006 | Sarif .............................. 206/5 |
| D544,022 | S | 6/2007 | Lane et al. |
| D546,371 | S | 7/2007 | Lane et al. |
| 7,284,853 | B2 * | 10/2007 | Friedman ..................... 351/47 |
| 2003/0097741 | A1 | 5/2003 | Feldman et al. |
| 2005/0168683 | A1 | 8/2005 | Darata et al. |
| 2006/0119787 | A1 | 6/2006 | Dai |
| 2006/0250570 | A1 | 11/2006 | Friedman |
| 2007/0002273 | A1 | 1/2007 | Yong |
| 2007/0091252 | A1 | 4/2007 | Lennox |

FOREIGN PATENT DOCUMENTS

EP    1 847 689 A1    10/2007
KR    2006-0050462 A    5/2006

OTHER PUBLICATIONS

International Search Report for International Application No. PCT/US2008/008384 (counterpart of U.S. Appl. No. 11/827,395), dated Oct. 31, 2008.
Written Opinion of the Int'l. Searching Authority for International Application No. PCT/US2008/008384 (counterpart of U.S. Appl. No. 11/827,395), dated Oct. 31, 2008.

* cited by examiner

*Primary Examiner*—Hung X Dang
(74) *Attorney, Agent, or Firm*—Westberg Law Offices

(57) ABSTRACT

The present invention provides clip-on sunglasses and methods of manufacture thereof. In accordance with an embodiment, the clip-on sunglasses comprise first and second lenses, each having retainer prongs positioned at an outer portion of each lens. The retainer prongs configured to engage an outer edge of eyeglasses. A bridge structure comprises first and second base portions affixed at inner portions of each of the first and second lenses. Each base portion comprises a protrusion. The bridge structure further comprises a elastic spanning member molded over the protrusions thereby being affixed to the first and second base portions.

25 Claims, 8 Drawing Sheets

CLIP-ON SUNGLASSES AND METHOD OF MANUFACTURE THEREOF

FIELD OF THE INVENTION

The present invention relates to the field of clip-on sunglasses configured to be attached to eyeglasses.

BACKGROUND OF THE INVENTION

Clip-on sunglasses are designed to be removably attached to eyeglasses. For example, a person may have a pair of eyeglasses with un-tinted, prescription lenses. Clip-on sunglasses having tinted lenses may then be attached to the eyeglasses such that the person sees through both sets of lenses. As a result, the person obtains the benefit of the prescription lenses of the eyeglasses as well as the tinted lenses of the clip-on sunglasses.

It is desirable for the clip-on sunglasses to be quickly and easily attached and removed from the eyeglasses so that the person can selectively employ the clip-on sunglasses when desired. For example, the person may attach the clip-on sunglasses when going outdoors during the day and may remove them when returning indoors or upon nightfall.

There are number of devices that have been used to attach clip-on sunglasses to eyeglasses. For example, magnets have been employed in clip-on sunglasses to magnetically attach the clip-on sunglasses to eyeglasses having a ferrous metallic frame. Another example is a spring mechanism including a coiled metallic spring and in which frame parts having prongs at their outer portions are biased toward each other by the spring mechanism. The frame can be expanded by pulling the frame parts away from each other and, then, the frame can be placed over a pair of eyeglasses. When released, the spring secures the clip-on sunglasses to the eyeglasses by holding the prongs against outer edges of the eyeglasses. Another example is a clip-on sunglass in which its entire frame, including prongs, is molded of a single piece of hard plastic. The plastic of the frame is sufficiently resilient that the frame can be distorted such that the prongs can be slipped over the edges of the eyeglass frame and held in place.

SUMMARY OF THE INVENTION

The present invention provides clip-on sunglasses and methods of manufacture thereof. In accordance with an embodiment, the clip-on sunglasses comprise first and second lenses, each having retainer prongs positioned at an outer portion of each lens. The retainer prongs are configured to engage an outer edge of eyeglasses. A bridge structure comprises first and second base portions affixed at inner portions of each of the first and second lenses. Each base portion comprises a protrusion. The bridge structure further comprises a elastic spanning member molded over the protrusions thereby being affixed to the first and second base portions.

In accordance with another embodiment, a method is provided for manufacturing clip-on sunglasses adapted to be mounted to eyeglasses. In accordance with the method, first and second frame members are formed. The first and second frame members are configured to accept first and second lenses respectively. An outer portion of each of the first and second frame members has retainer prongs that are configured to engage an outer edge of eyeglasses. An inner portion of each of the first and second frame members has an integrally-formed protrusion. An elastic spanning member is molded over the protrusions thereby affixing the elastic spanning member to the first and second base portions.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
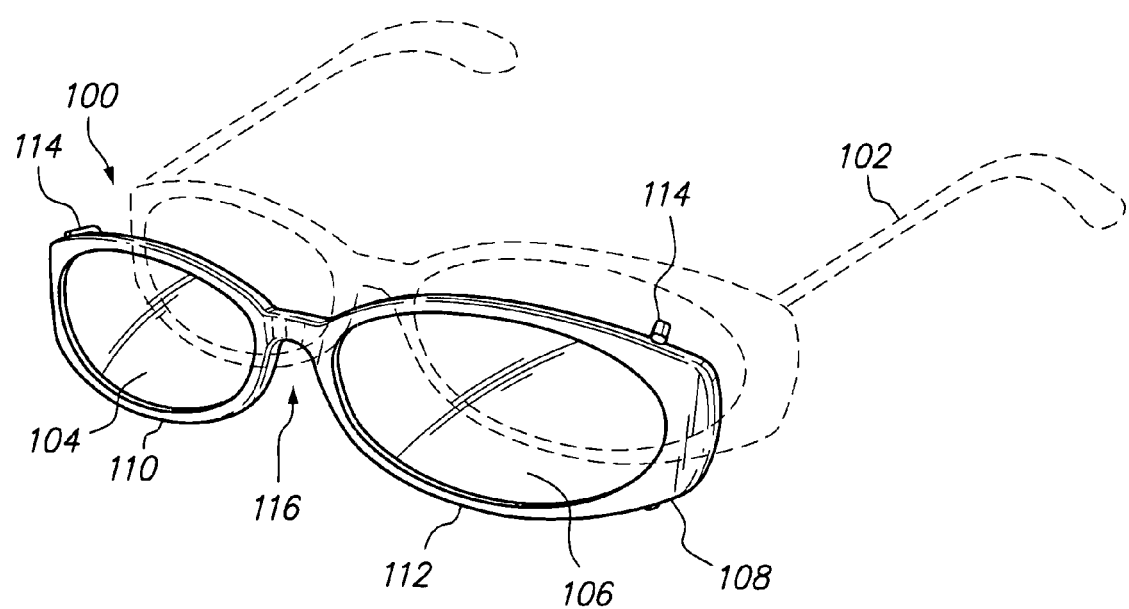
FIG. 1 illustrates a perspective view of clip-on sunglasses in accordance with an embodiment of the present invention.
Figure 2A:
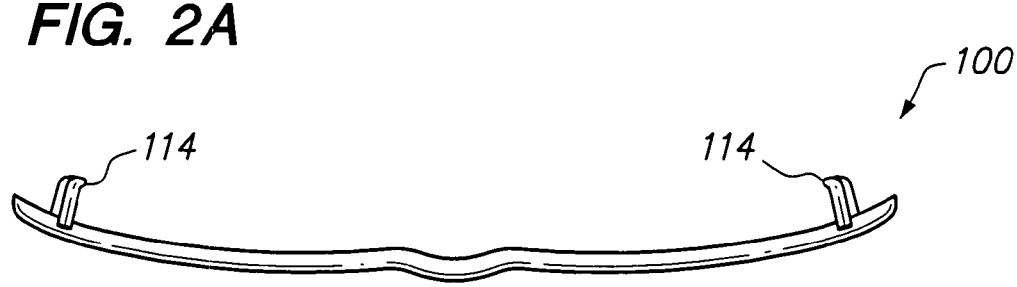
FIGS. 2A-C illustrate top, rear and side views, respectively, of the clip-on sunglasses in accordance with an embodiment of the present invention.
Figure 2B:
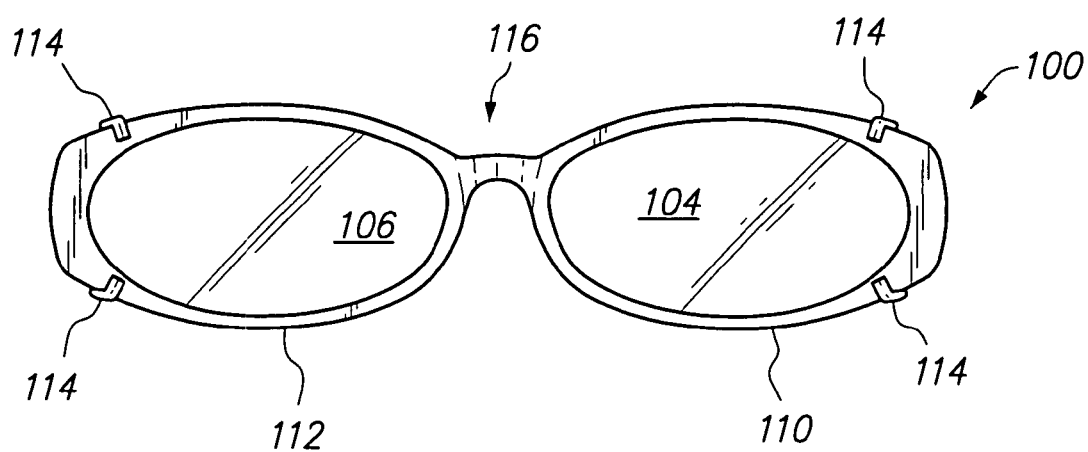
Figure 2C:
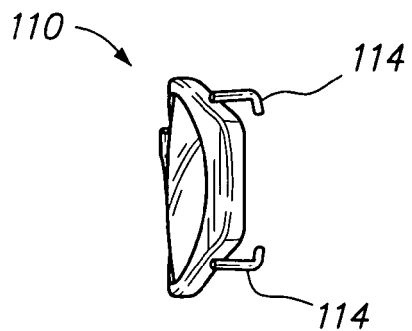

The present invention provides clip-on sunglasses and methods of manufacture thereof. FIG. 1 illustrates a perspective view of clip-on sunglasses 100 in accordance with an embodiment of the present invention. FIGS. 2A-C illustrate top, rear and side views, respectively, of the clip-on sunglasses 100. The clip-on sunglasses 100 are designed to be removably attached to eyeglasses 102 (FIG. 1). The eyeglasses 102 may be, for example, conventional prescription eyeglasses.

Referring to FIGS. 1 and 2A-C, the clip-on sunglasses 100 comprise a first lens 104 and a second lens 106. The clip-on sunglasses 100 further comprise a frame 108 having a first frame member 110 and a second frame member 112. The lenses 104 and 106 are affixed to the frame 108. In this embodiment, the frame members 110 and 112 surround the first and second lenses 104 and 106. For example, the peripheries of the lenses 104 and 106 may be retained in a channel in each of the frame members 110 and 112. In other embodiments, the frame members 110 and 112 may not completely surround the lenses 104 and 106.

Retainer prongs 114 are positioned on the frame members 110 and 112 at outer portions of the lenses 104 and 106. The retainer prongs 114 are configured to engage an outer edge of the eyeglasses 102. In a preferred embodiment, two retainer prongs 114 are affixed to each of the frame members 110 and 112 such that the clip-on sunglasses 100 are provided with a total of four retainer prongs 114. It will be apparent that a different configuration of the retainer prongs 114 may be employed. In an embodiment, each of the frame members 110 and 112 and its respective retainer prongs 114 are formed of a single piece of material, such as molded hard plastic.

Figure 3A:
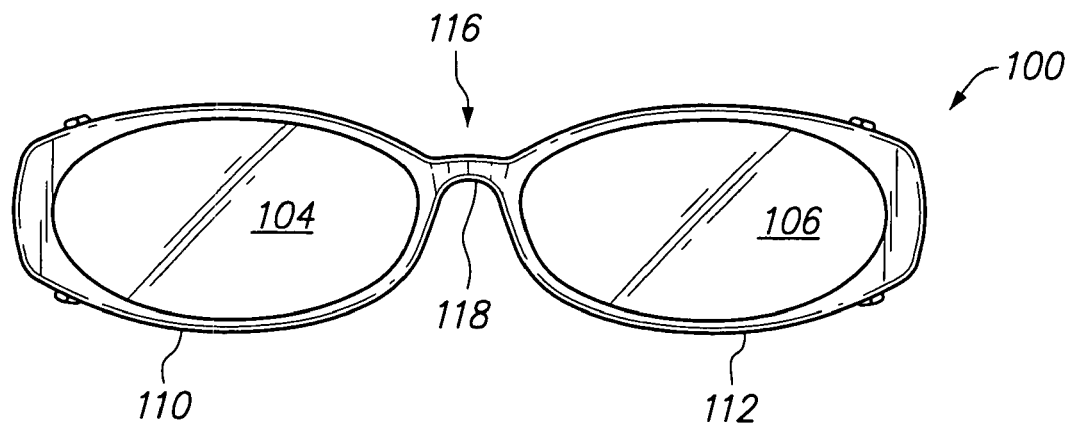
FIGS. 3A-B illustrate front views showing clip-on sunglasses in unexpanded and expanded positions, respectively, in accordance with an embodiment of the present invention.
Figure 3B:
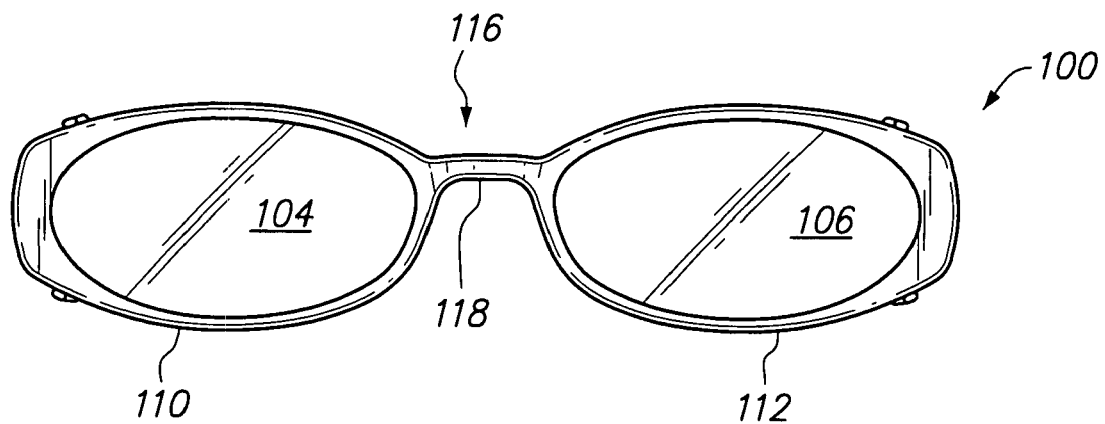

A bridge structure 116 connects the frame members 110 and 112 to each other. The bridge structure 116 comprises an elastic spanning member 118 (FIGS. 3A-B) that allows the bridge structure 116 to stretch such that the first and second frame members 110 and 112 can be pulled apart under an applied tension without disconnecting the frame members 110 and 112 from each other. FIG. 3A illustrates a front view of the clip-on sunglasses 100 showing the clip-on sunglasses 100 in an unexpanded position, while FIG. 3B illustrates a front view showing the clip-on sunglasses 100 in an expanded position. When the tension is released, the elastic spanning member 118 resumes its original shape so that the clip-on sunglasses 100 return to the unexpanded position.

By expanding the clip-on sunglasses 100, placing them over the eyeglasses 102 (FIG. 1) and then releasing the clip-on sunglasses 100, the clip-on sunglasses 100 can be quickly and easily mounted to the eyeglasses 102. The dimensions of the clip-on sunglasses 100 and the positions of the prongs 114 are such that, when released over the eyeglasses 102, some tension remains in the elastic of the bridge structure 116. This causes the retainer prongs 114 to be held against the eyeglasses 102 under tension so that the clip-on sunglasses 100 are firmly affixed to the eyeglasses 102. In addition, the elastic is dimensioned and is of sufficient elasticity that eyeglasses 102 having a range of sizes and shapes can be accommodated by the clip-on sunglasses 100.

To remove the clip-on sunglasses 100 from the eyeglasses 102, tension may be reapplied to expand the clip-on sunglasses 100 sufficiently that the eyeglasses 102 are released from the retainer prongs 114.

In a preferred embodiment, the spanning member 118 is a unitary structure (i.e. a single piece) and formed of a non-metallic, rubber-like material, such as natural or synthetic rubber, silicone, etc. The frame members 110 and 112 are preferably formed of plastic, such as thermoplastic (e.g. nylon) or thermosetting plastic (e.g. synthetic resin). The frame members 110 and 112 may be resilient but are substantially less resilient than the elastic spanning member 118.

A property of rubber and similar materials is that they tend not to form strong chemical bonds with plastic materials. Therefore, in a preferred embodiment, the bridge structure 116 comprises a means for mechanically fastening the elastic spanning member 118 to the frame members 110 and 112. Chemical bonding may be used in addition to, or in place of, the mechanical fastening means.

Figure 4A:
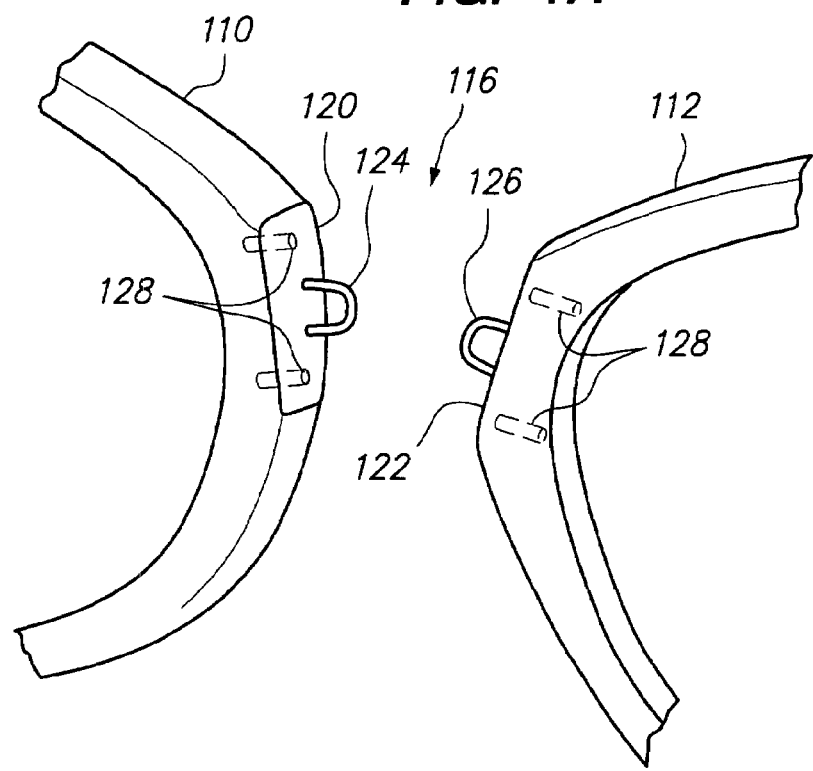
FIGS. 4A-B illustrate a portion of the clip-on sunglasses at intermediate stages of manufacture in accordance with an embodiment of the present invention.
Figure 4B:
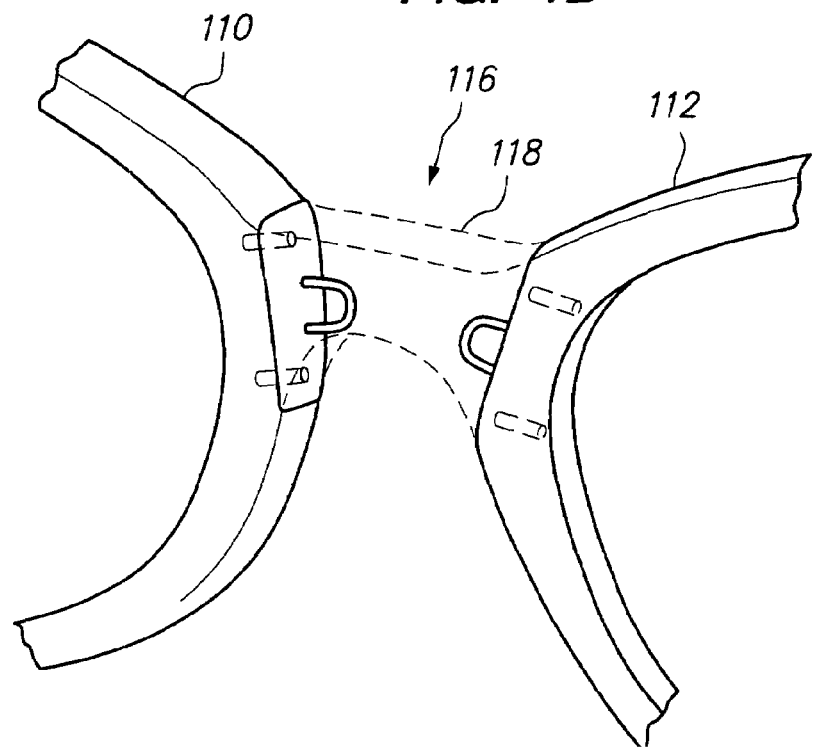

FIGS. 4A-B illustrate a portion of the clip-on sunglasses 100 at intermediate stages of manufacture in accordance with an embodiment of the present invention. Particularly, FIG. 4A shows inner portions of the first and second frame members 110 and 112, along with portions of the bridge structure 116. The bridge structure 116 comprises a first base portion 120 and a second base portion 122 which are affixed to the frame of the clip-on sunglasses 100.

The bridge structure 116 further comprises a first protrusion 124 which is affixed to the base portion 120 and a second protrusion 126 that is affixed to the base portion 122. The bridge structure 116 preferably also comprises recesses 128. In a preferred embodiment, the base portions 120 and 122, protrusions 124 and 126 and recesses 128 are integrally molded with the frame members 110 and 112 (including the retainer prongs 114) from a single piece of material, such as hard plastic. While a single protrusion 124, 126 is shown in each frame member 110 and 112, it will be apparent that each frame member 110 and 112 may comprise one or more additional protrusions. In addition, while two recesses 128 are shown in each frame member 110 and 112, it will be apparent that more or fewer recesses 128 may be provided.

FIG. 4A also shows that the elastic spanning member 118 of the bridge structure 116 has not yet been formed. FIG. 4B shows the elastic spanning member 118 having been formed (with the elastic spanning member 118 being drawn with dotted lines). During the manufacture the clip-on sunglasses, the frame members 110 and 112 may first be formed, including the base portions 120 and 122, protrusions 124 and 126 and recesses 128. Then, elastic material may be molded over the base portions 120 and 122, over the protrusions 124 and 126 and into recesses 128 to form the elastic spanning member 118.

In a preferred embodiment, the protrusions 124 and 126 each comprise at least one aperture through which the elastic spanning member 118 extends and rejoins itself. Therefore, as shown in FIG. 4A, the protrusions 124 and 126 are in the shape of loops. It will be apparent, however, that another shape having one or more apertures may be provided. Because the elastic passes through the apertures and rejoins itself, this creates a firm mechanical attachment of the elastic spanning member 118 to the frame members 110 and 112. In this configuration, the elastic spanning member 118 cannot be separated from either frame member 110 or 112 unless the elastic is torn or unless the frame member is damaged (e.g. one of the loops is opened).

In addition, while the elastic spanning member 118 is being formed, material of the elastic spanning member 118 enters the recesses 128. The elastic spanning member 118 is thus secured to the recesses 128 (e.g. by chemical bonding and or friction) which tends to increase the strength of the bond between the elastic spanning member 118 and the frame members 110 and 112. In a preferred embodiment at least one recess is positioned above and below each of the protrusions 124 and 126, which tends to prevent the elastic material of the spanning member 118 from pulling away from the base portions 120 and 122. The strength of the bond is further enhanced by the increased surface area in which the elastic material of the spanning member 118 contacts the base portions 120 and 122. In addition, the interior sides of the recesses 128 may be approximately parallel to the tension applied to laterally expand the clip-on sunglasses 100. This also tends to increase the strength of the bond.

As shown in FIGS. 4A-B, the recesses are unconnected from each other. In an alternative embodiment, the recesses 128 may be connected to each other by a hollow tunnel. The elastic material of the spanning member 118 may then extend into the aperture formed by the recesses 128 and the tunnel so that it rejoins itself in a loop. This embodiment, the protrusions may optionally be omitted.

In an alternative embodiment, the apertures in the protrusions may be omitted. In this case, the elastic spanning member 118 is preferably secured to the frame members 110 and 112 by other mechanical fastening means. For example, the protrusions may be bulb-shaped such that each protrusion comprises a neck that is adjacent to the base portions 120 and 122 and that is narrower than an end portion of the protrusion that is distal from the base portions 120 and 122. When the elastic spanning member 118 is formed over the protrusions, the elastic conforms to the shape of the protrusions, including the narrow necks, such that disengagement of the elastic spanning member 118 would require stretching of the elastic over the end portions of the protrusions.

In accordance with an embodiment of the present invention, a method of manufacture of the clip-on sunglasses 100 is provided. In a first step, the frame members 110 and 112 are formed. This may be accomplished by forming the frame members 110 and 112 using a mold into which liquid plastic is injected. Upon completion of the first step, the frame members 110 and 112 may appear as in FIG. 4A. In a second step, the frame members 110 and 112 may both be placed into another mold into which the liquid elastic material is injected to form the elastic spanning member 118. Upon completion of the second step, the clip-on sunglasses 100 may appear as in FIG. 4B. In a third step, the lenses 104 and 106 may be affixed to the frame members 110 and 112.

In a preferred embodiment, the elastic spanning member 118 forms a smooth contour with each of the first and second frame members 110 and 112. In addition, the first and second base portions 120 and 122 are preferably hidden from view beneath the elastic spanning member 118. Therefore, as shown in FIGS. 1-3, the clip-on sunglasses 100 have the appearance of having been formed from a single piece of material. This effect may be enhanced by selecting the color of the elastic spanning member 118 to match that of the frame members 110 and 112.

Figure 5A:
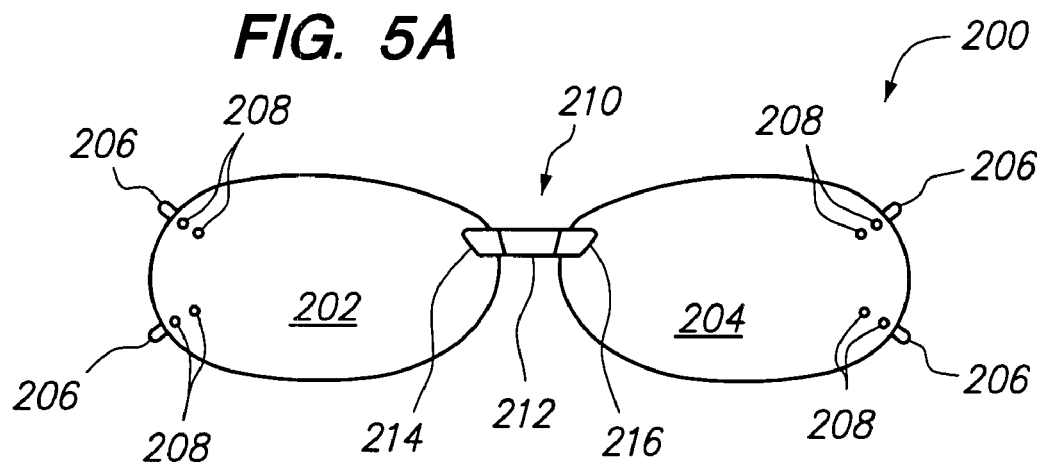
FIGS. 5A-B illustrate front and rear views, respectively, of frameless clip-on sunglasses in accordance with an embodiment of the present invention.
Figure 5B:
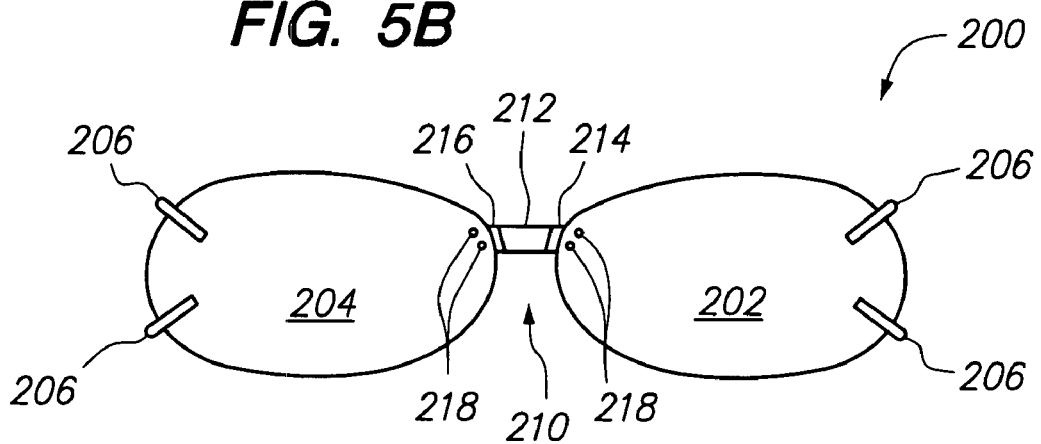

The above-described embodiments of clip-on sunglasses incorporate frame members 110 and 112 which partially or completely surround the first and second lenses 104 and 106. In other embodiments, the clip-on sunglasses may be frameless. FIGS. 5A-B illustrate a front and rear views, respectively, of frameless clip-on sunglasses 200 in accordance with an embodiment of the present invention.

Referring to FIGS. 5A-B, the frameless clip-on sunglasses 200 comprise a first lens 202 and a second lens 204. Retainer prongs 206 are positioned at outer portions of the lenses 202 and 204. In a preferred embodiment, the retainer prongs 206 are attached directly to the lenses 202 and 204. For example, apertures 208 may be provided in the lenses 202 and 204 through which a portion the retainer prongs extend. The retainer prongs 206 function in the same manner as the retainer prongs 114 described above in reference to FIGS. 1-4. While two retainer prongs 206 are shown affixed to each of lenses 202 and 204, a different configuration of the retainer prongs 206 may be employed. In an embodiment, the retainer prongs 206 are formed of molded hard plastic.

A bridge structure 210 connects the lenses 202 and 204 to each other. The bridge structure 210 comprises an elastic spanning member 212 and base portions 214 and 216. The first base portion 214 is attached to the lens 202, while the second base portion 216 is attached to the lens 204. The elastic spanning member 212 is attached to each of the base portions 214 and 216. In a preferred embodiment, the base portions 214 and 216 are attached directly to the lenses 202 and 204. For example, apertures 218 may be provided in the lenses 202 and 204 through which the base portions 214 and 216 extend.

The bridge structure 210 functions in the same manner as the bridge structure 116 described above in reference to FIGS. 1-4. Thus, the elastic spanning member 212 allows the bridge structure 210 to stretch such that the first and second lenses 202 and 204 can be pulled apart under an applied tension and, when the tension is released, the elastic spanning member 212 resumes its original shape so that the clip-on sunglasses 200 return to the unexpanded position. In this way, the clip-on sunglasses 200 can be quickly and easily mounted to and removed from eyeglasses.

In a preferred embodiment, the spanning member 212 is a unitary structure (i.e. a single piece) and formed of a nonmetallic, rubber-like material, such as natural or synthetic rubber, silicone, etc. The base portions 214 and 216 of the bridge structure 210 are preferably formed of plastic, such as thermoplastic (e.g. nylon) or thermosetting plastic (e.g. synthetic resin). In a preferred embodiment, the bridge structure 210 comprises a means for mechanically fastening the elastic spanning member 212 to the base portions 214 and 216. Chemical bonding may be used in addition to, or in place of, the mechanical fastening means.

Figure 6A:
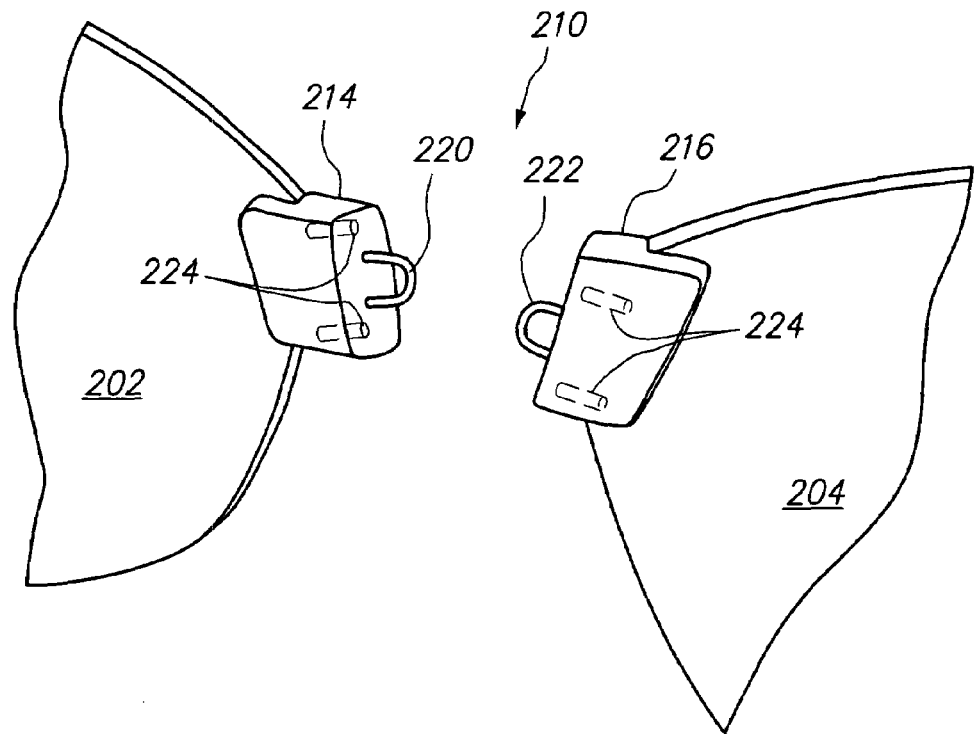
FIGS. 6A-B illustrate a portion of the frameless clip-on sunglasses at intermediate stages of manufacture in accordance with an embodiment of the present invention.
Figure 6B:
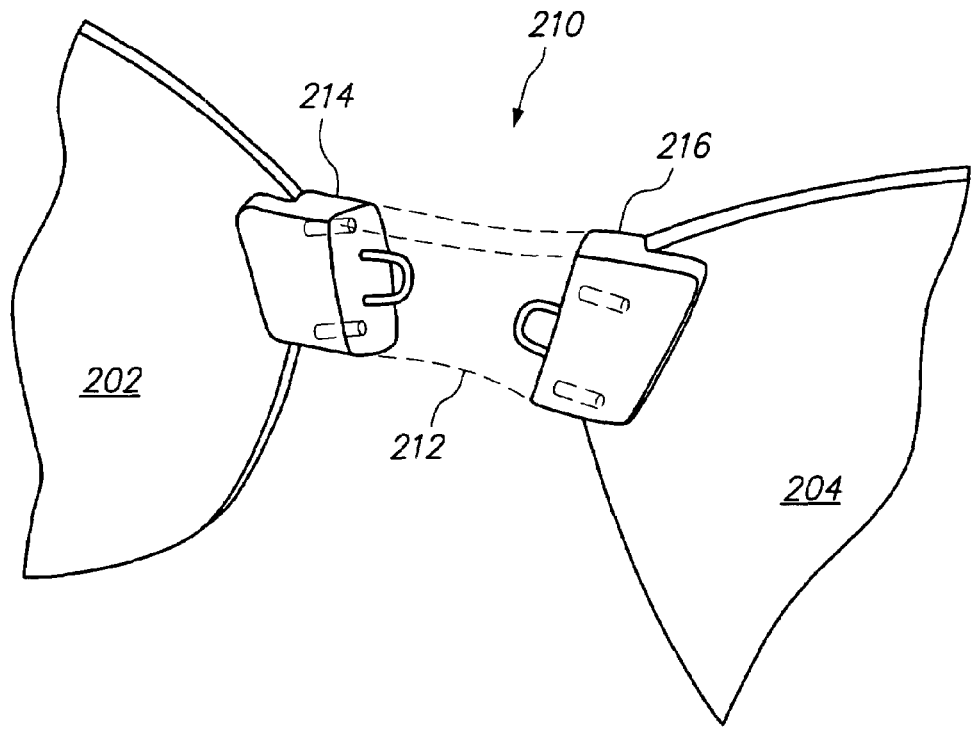

FIGS. 6A-B illustrate a portion of the frameless clip-on sunglasses 200 at intermediate stages of manufacture in accordance with an embodiment of the present invention. Particularly, FIG. 6A shows inner portions of the first and second lenses 202 and 204, along with the base portions 214 and 216 of the bridge structure 210. As shown in FIG. 6A, the bridge structure 210 further comprises a first protrusion 220 which is affixed to the base portion 214 and a second protrusion 222 that is affixed to the base portion 216. The bridge structure 210 preferably also comprises recesses 224. In a preferred embodiment, the base portion 214, the protrusion 220 and corresponding recesses 224 are integrally molded from a single piece of material, such as hard plastic. Similarly, the base portion 216, the protrusion 222 and corresponding recesses 224 are preferably integrally molded from a single piece of the same material. While a single protrusion 220 and 222 is shown for each base portion 214 and 216, it will be apparent that one or more additional protrusions may be provided. In addition, while two recesses 224 are shown for each base portion 214 and 216, it will be apparent that more or fewer recesses 224 may be provided. In a preferred embodiment at least one recess 224 is positioned above and below each of the protrusions 220 and 222.

FIG. 6A also shows that the elastic spanning member of the bridge structure 210 has not yet been formed. FIG. 6B shows the elastic spanning member 212 having been formed (with the elastic spanning member 212 being drawn with dotted lines). During the manufacture the clip-on sunglasses 200, the base portions 214 and 216 may first be formed. Then, elastic material may be molded between the base portions 214 and 216, over the protrusions 220 and 222 and into recesses 224 to form the elastic spanning member 212.

Similarly to the embodiment shown in FIGS. 4A-B, the protrusions 220 and 222 each preferably comprise at least one aperture through which the elastic spanning member 212 extends and rejoins itself. However, that another shape having one or more apertures may be provided. Alternatively, the apertures in the protrusions may be omitted. In this case, the elastic spanning member 212 is preferably secured to the base portions 214 and 216 by other mechanical fastening means. For example, as explained above in connection with the embodiment of FIGS. 4A-B, the protrusions may be bulb-shaped with the elastic spanning member 212 being formed over the protrusions.

In accordance with an embodiment of the present invention, a method of manufacture of the clip-on sunglasses 200 is provided. In a first step, base portions 214 and 216 are formed. This may be accomplished by forming the base portions 214 and 216 using a mold into which liquid plastic is injected. Upon completion of the first step, the base portions 214 and 216 may appear as in FIG. 6A (though at this point, the base portions 214 and 216 may not be attached to the lenses 202 and 204). In a second step, the base portions 214 and 216 may both be placed into another mold into which the liquid elastic material is injected to form the elastic spanning member 212. In a third step, the lenses 202 and 204 may be affixed to the bridge structure 210. Upon completion of the third step, the clip-on sunglasses 200 may appear as in FIG. 6B. At any point during the steps above, the retainer prongs 206 may be attached to the lenses 202 and 204.

Figure 7:
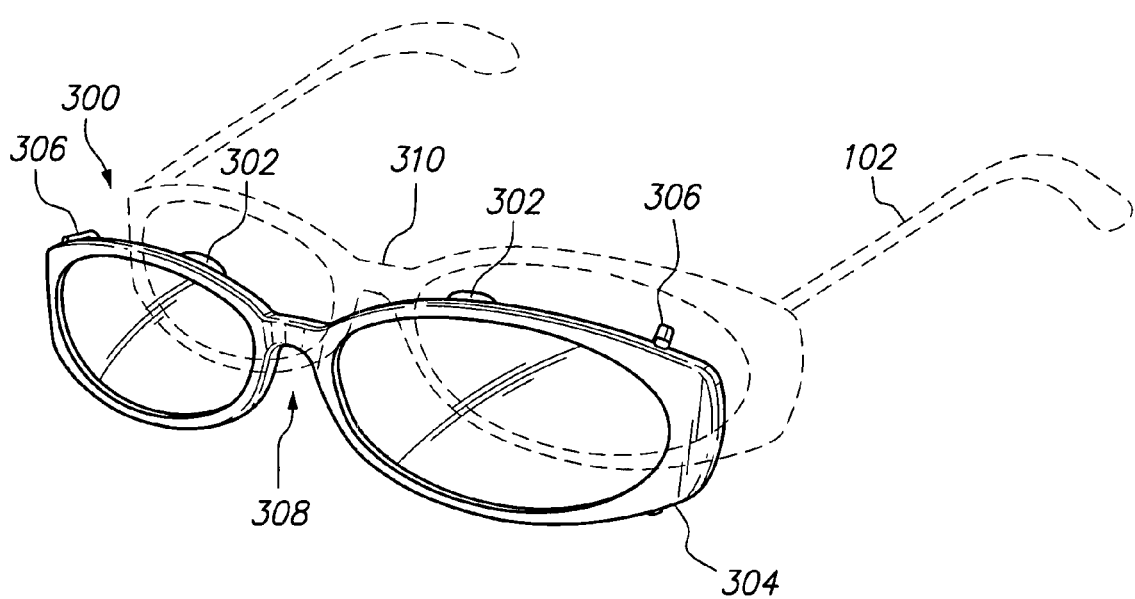
FIG. 7 illustrates clip-on sunglasses in accordance with an alternative embodiment of the present invention.

FIG. 7 illustrates clip-on sunglasses 300 in accordance with an alternative embodiment of the present invention. The clip-on sunglasses 300 of FIG. 7 may be identical to the clip-on sunglasses 100 shown in FIG. 1 except that the sunglasses 300 of FIG. 7 include optional tabs 302. The tabs 302 are attached to the clip-on sunglasses frame 304. For example, the tabs 302 may be formed integrally with the frame 304. The tabs 302 extend rearwardly from the frame 304 and are located above the lenses between the upper retainer prongs 306 and the bridge structure 308. Preferably, two tabs 302 provided with one attached to each frame member on opposite sides the bridge structure 308. The tabs 302 are preferably located closer to the bridge structure 308 than to the prongs 306. The tabs 302 inhibit the bridge structure 308 from bending when attached to the eyeglasses 102 by engaging (i.e. resting on) the outer edge of the eyeglasses 102. Otherwise, the two frame members might rotate with respect to each other, causing the bridge structure 308 to be out of alignment with the bridge of the eyeglasses 102.

Figure 8A:
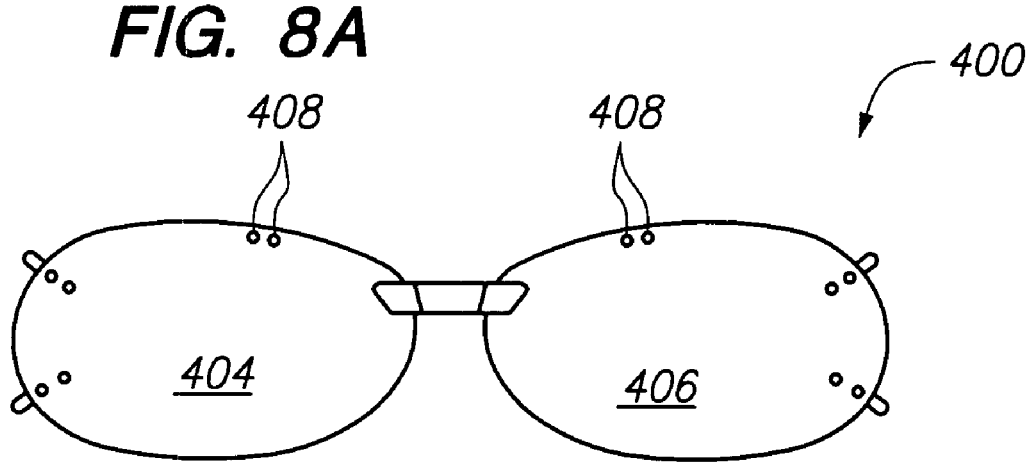
FIGS. 8A-B illustrates frameless clip-on sunglasses in accordance with an alternative embodiment of the present invention.
Figure 8B:
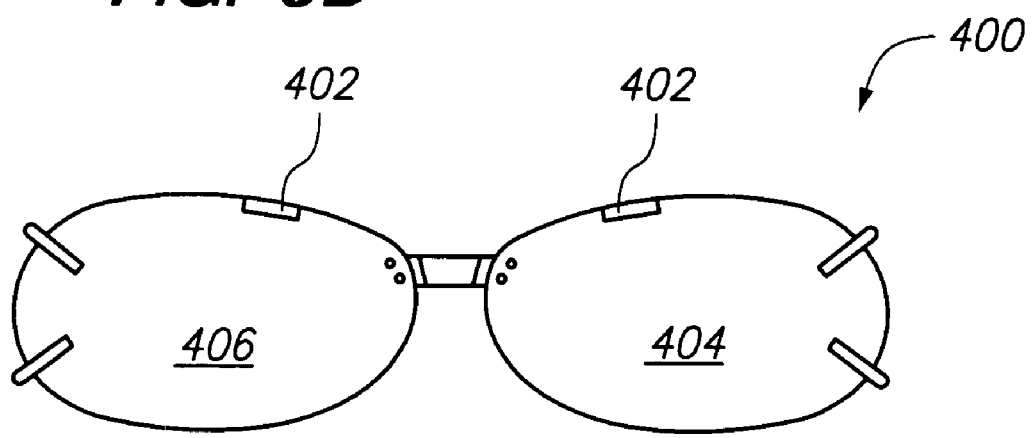

FIGS. 8A-B illustrates frameless clip-on sunglasses 400 in accordance with an alternative embodiment of the present invention. The frameless clip-on sunglasses 400 of FIGS. 8A-B may be identical to the frameless clip-on sunglasses 200 shown in FIGS. 5A-B except that the sunglasses 300 of FIGS. 8A-B include optional tabs 402. In a preferred embodiment, the tabs 402 are attached directly to the lenses 404 and 406. For example, apertures 408 may be provided in the lenses 404 and 406 through which a portion the tabs 402 extend. The tabs 402 function in the same manner as the tabs 302 described above in reference to FIG. 7.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. Clip-on sunglasses adapted to be mounted to eyeglasses, the clip-on sunglasses comprising:
   first and second lenses, each having retainer prongs positioned at an outer portion of each lens, the retainer prongs configured to engage an outer edge of the eyeglasses; and
   a bridge structure comprising first and second base portions affixed at inner portions of each of the first and second lenses, each base portion comprising a protrusion, and the bridge structure comprising an elastic spanning member molded over the protrusions thereby being affixed to the first and second base portions.

2. The clip-on sunglasses according to claim 1, wherein the protrusions are hidden from view beneath the elastic spanning member.

3. The clip-on sunglasses according to claim 1, wherein the protrusions each comprise at least one aperture through which the elastic spanning member extends and rejoins itself.

4. The clip-on sunglasses according to claim 1, the protrusions each having a neck that is narrower than an end portion of the protrusion.

5. The clip-on sunglasses according to claim 1, further comprising first and second frame members affixed to peripheries of the first and second lenses respectively, the first and second base portions being molded integrally with the first and second frame members, respectively.

6. The clip-on sunglasses according to claim 5, wherein the protrusions are hidden from view beneath the elastic spanning member and wherein the elastic spanning member forms a smooth contour with each of the first and second frame members.

7. The clip-on sunglasses according to claim 6, wherein the elastic spanning member and the first and second frame members have the appearance of being formed of a single piece of material.

8. The clip-on sunglasses according to claim 5, wherein the first and second frame members completely encircle the first and second lenses.

9. The clip-on sunglasses according to claim 5, further comprising a tab attached to each of the first and second frame members and configured to inhibit the bridge structure from bending by engaging the outer edge of the eyeglasses.

10. The clip-on sunglasses according to claim 1, wherein the first and second lenses are frameless.

11. The clip-on sunglasses according to claim 10, wherein the first and second base portions are affixed directly to the first and second lenses, respectively.

12. The clip-on sunglasses according to claim 11, wherein the first and second base portions are affixed to the first and second lenses, respectively, through apertures in the first and second lenses.

13. The clip-on sunglasses according to claim 11, wherein the retainer prongs are affixed directly to a respective one of the first and second lenses.

14. The clip-on sunglasses according to claim 11, further comprising a tab attached to each of the first and second lenses and configured to inhibit the bridge structure from bending by engaging the outer edge of the eyeglasses.

15. The clip-on sunglasses according to claim 1, wherein the first and second base members further comprise recesses and wherein the elastic spanning member is molded into each of the recesses.

16. The clip-on sunglasses according to claim 15, wherein the recesses are positioned such that one recess is positioned above and below each of the protrusions.

17. The clip-on sunglasses according to claim 1, wherein the retainer prongs engage an outer edge of the eyeglasses by stretching the elastic member.

18. Clip-on sunglasses adapted to be mounted to eyeglasses, the clip-on sunglasses comprising:
   first and second lenses, each having retainer prongs positioned at an outer portion of each lens, the retainer prongs configured to engage an outer edge of the eyeglasses; and
   a bridge structure comprising first and second base portions affixed at inner portions of each of the first and second lenses, each base portion comprising an aperture, and the bridge structure comprising an elastic spanning member that is molded through the apertures of the first and second base portions such that the elastic spanning member rejoins itself thereby being affixed to the first and second base portions.

19. The clip-on sunglasses according to claim 18, wherein each base portion further comprises a protrusion, and wherein the spanning member is molded over the protrusions.

20. A method of manufacturing clip-on sunglasses adapted to be mounted to eyeglasses, the method comprising:
   forming first and second frame members configured to accept first and second lenses respectively, an outer portion of each of the first and second frame members having retainer prongs configured to engage an outer edge of eyeglasses and an inner portion of each of the first and second frame members having an integrally-formed protrusion; and
   molding an elastic spanning member over the protrusions thereby affixing the elastic spanning member to the first and second base portions.

21. The method according to claim 20, wherein the first and second frame members are formed of injection molded plastic.

22. The method according to claim 21, wherein molding the elastic spanning member comprises placing the first and second frame members into a mold and injection molding the elastic spanning member in the mold.

23. A method of manufacturing clip-on sunglasses adapted to be mounted to eyeglasses, the method comprising:

forming first and second base portions configured for attachment to first and second lenses respectively, each base portion having a protrusion;

molding an elastic spanning member over the protrusions of the first and second base portions thereby affixing the elastic spanning member to the first and second base portions;

affixing the first and second base portions to an inner portion of each of the first and second lenses, respectively; and affixing retainer prongs to an outer portion of each of the first and second frame members.

24. The method according to claim 23, wherein the first and second base portions are formed of injection molded plastic.

25. The method according to claim 24, wherein molding the elastic spanning member comprises placing the first and second base portions into a mold and injection molding the elastic spanning member in the mold.

* * * * *